United States Patent
Chiu et al.

(10) Patent No.: US 7,040,857 B2
(45) Date of Patent: May 9, 2006

(54) FLEXIBLE SEAL ASSEMBLY BETWEEN GAS TURBINE COMPONENTS AND METHODS OF INSTALLATION

(75) Inventors: Rong Shi Paul Chiu, Glenmont, NY (US); John Robert Johnston, Marietta, GA (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 10/823,566

(22) Filed: Apr. 14, 2004

(65) Prior Publication Data

US 2005/0232764 A1  Oct. 20, 2005

(51) Int. Cl.
*F01D 11/02* (2006.01)

(52) U.S. Cl. .................... 415/1; 415/173.3; 415/199.1; 415/209.2; 415/209.3; 415/173.1

(58) Field of Classification Search ............. 415/173.1, 415/173.3, 209.2, 209.3, 1
See application file for complete search history.

(56) References Cited

U.S. PATENT DOCUMENTS

| 5,161,945 A | * | 11/1992 | Clevenger et al. .......... 415/177 |
| 5,797,723 A | * | 8/1998 | Frost et al. ............... 415/174.2 |
| 6,547,522 B1 | * | 4/2003 | Turnquist et al. ......... 415/173.3 |

* cited by examiner

*Primary Examiner*—Ninh H. Nguyen
(74) *Attorney, Agent, or Firm*—Nixon & Vanderhye P.C.

(57) ABSTRACT

A preloaded spring assembly is provided in a recess in each shroud in axial opposition to an aft facing sealing surface of a turbine nozzle retaining ring. Each spring assembly includes a spring, preferably a bellows type spring, with a plate mounted on one side and a sealing surface on the side of the plate remote from the spring. The sealing surface may be an abradable coating or a honeycomb seal. The seal assembly is maintained preloaded by a wrap which upon reaching turbine operating temperature disintegrates, enabling the spring to load the sealing surface against the retaining ring surface to prevent or minimize air leakage from outside the nozzle retainer ring into the hot gas path.

10 Claims, 2 Drawing Sheets

FLEXIBLE SEAL ASSEMBLY BETWEEN GAS TURBINE COMPONENTS AND METHODS OF INSTALLATION

BACKGROUND OF THE INVENTION

The present invention relates to a flexible seal assembly for sealing between abutting surfaces in a turbine and particularly relates to a flexible seal assembly disposed between a gas turbine nozzle retaining ring and a shroud for minimizing or precluding leakage flow of compressor discharge air into the hot gas path. The present invention also relates to a method of assembling the flexible seal assembly.

In turbines, it is necessary to seal between certain components. For example, in a gas turbine, a nozzle retaining ring and shrouds have abutting opposed surfaces interposed between compressor discharge air on one side of the surfaces and the hot gas path on the opposite side. Typically a seal plate is disposed between the nozzle retaining ring and the shrouds at their interfaces. The nozzle retaining ring, however, is subjected to temperature gradients on the order of 200–300° F. as well as very large mechanical loadings. Moreover, the nozzle retaining ring, seal plate and shrouds are fabricated of different materials with different coefficients of thermal expansion. During turbine start up and shutdown cycles, the interfaced parts are mismatched thermally. Also, because the seal plate is bolted to the retaining ring wall, the seal plate and retaining ring distort simultaneously. These distortions caused by combined thermal and mechanical loadings in cyclic operations cause the nozzle retaining ring to deform with the result that the seal plate is not adequate to seal leakage gaps which develop between the nozzle retaining ring and the shrouds. Accordingly, there is a need for an effective seal between the nozzle retaining ring and shrouds which can accommodate thermal and mechanical distortions of the nozzle retaining ring during cyclic operations to minimize or preclude leakage flow through gaps at the interface of the ring and the shrouds.

BRIEF DESCRIPTION OF THE INVENTION

In accordance with a preferred aspect of the present invention, first and second generally abutting components of a turbine, for example, a nozzle retaining ring and a turbine shroud, are provided with a seal at their interface. The seal is biased to conform to relative movement between these components. Particularly, a slot is formed in one of the components at the interface and receives a preloaded spring assembly including a spring, a plate secured on one side to one end of the spring and either an abradable coated seal or a honeycomb seal on the opposite side of the plate remote from the spring. The preload is maintained during installation of the seal and is released in response to a turbine operating parameter such as temperature. Upon release, the sealing surface, i.e., the abradable coating or the honeycomb, is spring-biased into engagement with the opposing component to maintain the seal.

In a preferred embodiment according to the present invention, there is provided a seal assembly for a turbine comprising first and second generally abutting turbine components; a sealing plate; a spring on one side of the sealing plate; one of an abradable coating and a honeycomb seal on an opposite side of the plate; the spring bearing against the second component and biasing one of the coating and the honeycomb seal into sealing engagement with the first component.

In a further preferred embodiment according to the present invention, there is provided apparatus for sealing between components of a gas turbine comprising a nozzle retaining ring and a turbine shroud for radially overlying turbine buckets, the retaining ring and the shroud having respective first and second surfaces generally abutting one another, the second surface having a recess, a seal assembly disposed in the recess and including a sealing plate, a spring on one side of the sealing plate and bearing against a base of the recess and one of an abradable coating and a honeycomb seal on an opposite side of the plate from the spring and bearing against the first surface in sealing engagement therewith.

In a further preferred embodiment according to the present invention, there is provided a method of sealing between a nozzle retaining ring and a shroud for a gas turbine to minimize or preclude leakage of compressor discharge air into the hot gas path comprising the steps of providing a flexible seal assembly between the nozzle retaining ring and the shroud including a plate, a spring on one side of the plate and one of an abradable coating and a honeycomb seal on an opposite side of the plate from the spring; constraining the spring in a preloaded condition between the nozzle retaining ring and the shroud; and releasing the constraint to enable the spring to bias one of the abradable coating and the honeycomb seal against the nozzle retaining ring.

DETAILED DESCRIPTION OF THE INVENTION

Figure 1:
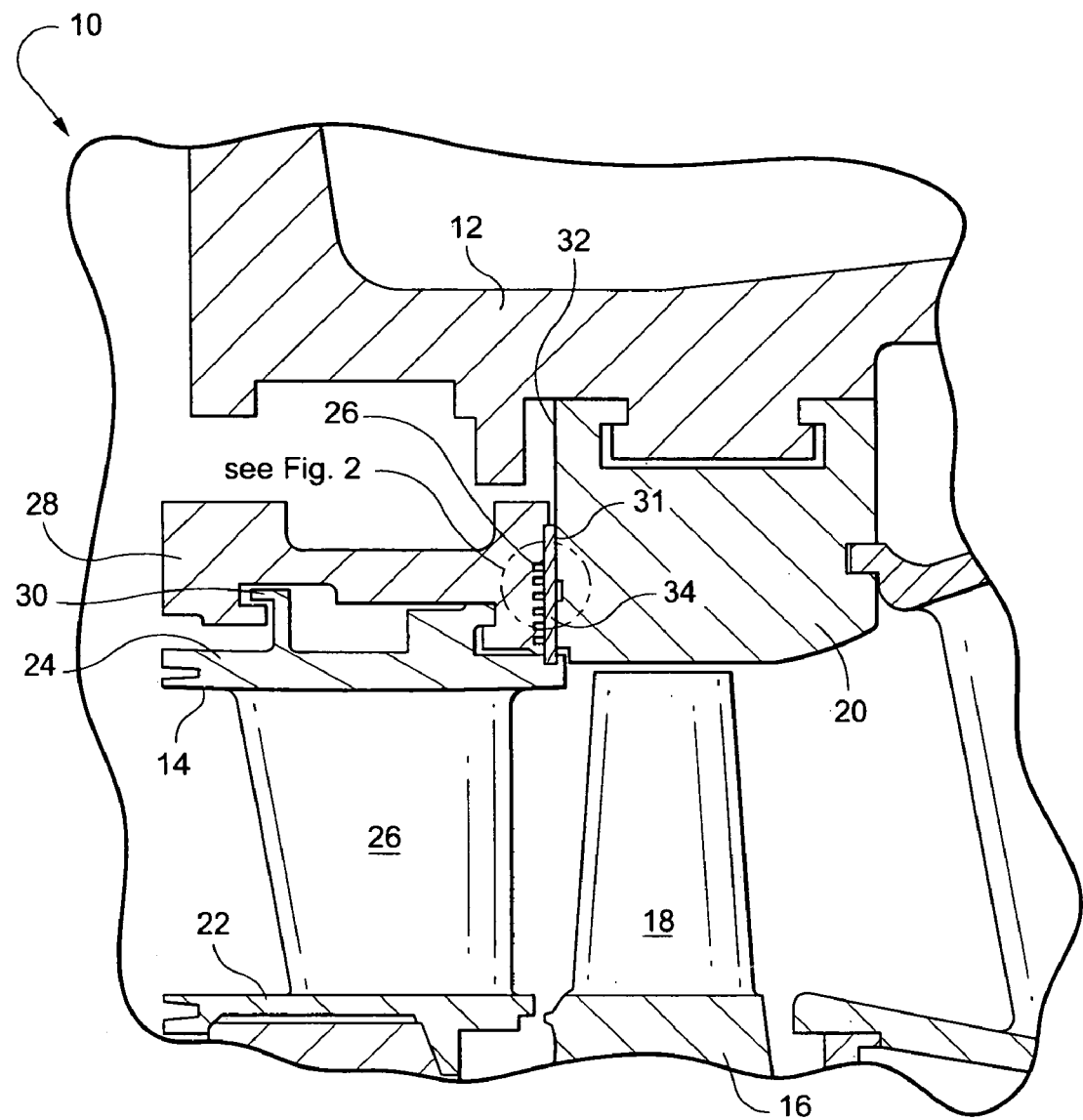
FIG. 1 is a fragmentary cross-sectional schematic illustration of a portion of the hot gas path of a turbine and illustrating a location of a flexible seal assembly according to the present invention.

Referring to FIG. 1, there is illustrated a portion of a turbine, generally designated 10, including a turbine casing 12, a nozzle assembly 14, a rotor 16 including a plurality of circumferentially spaced buckets 18 and a turbine shroud 20 mounted on casing 12 and surrounding the turbine buckets 18. It will be appreciated that the nozzle assembly 14 includes inner and outer bands 22 and 24, respectively, which mount a plurality of circumferentially spaced airfoils 26 therebetween, the airfoils 26 and buckets 18 forming a stage of the turbine 10. A retaining ring 28 typically supports the nozzle assembly 14 by a dovetail connection including hooks 30 mounted on the outer radial surface of the outer band 24. It will be appreciated that the shrouds 20 are provided in arcuate segments circumferentially adjacent one another about the entire periphery of the casing 32 and that the nozzle retaining ring 28 typically includes upper and lower halves lying in axial registration with the shrouds. In FIG. 1, the aft face 31 of the nozzle retaining ring 28 bears against the forward face 32 of the shroud 20. The aft face of the nozzle retaining ring includes a seal plate 34 and a plurality of passages 36 forwardly of the seal plate 34 through which cooling air is supplied.

Figure 2:
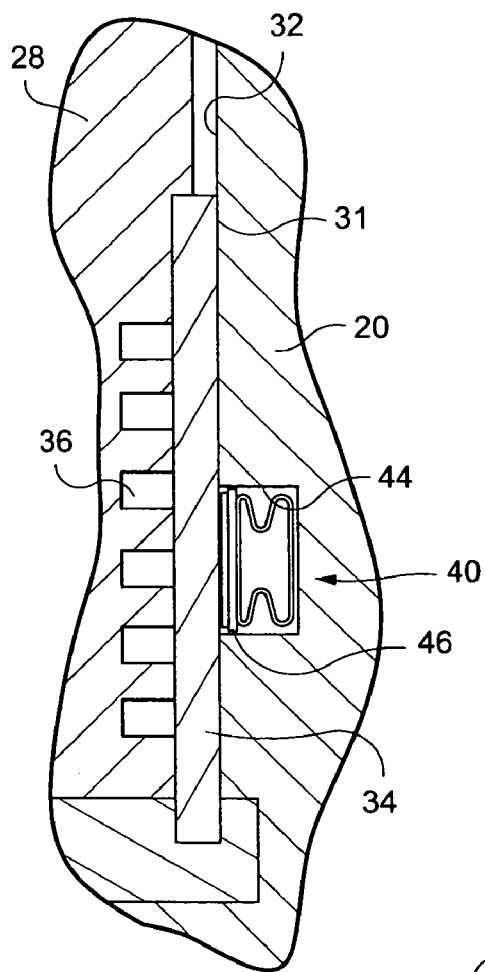
FIG. 2 is a fragmentary enlarged cross-sectional view illustrating the seal.
Figure 3:
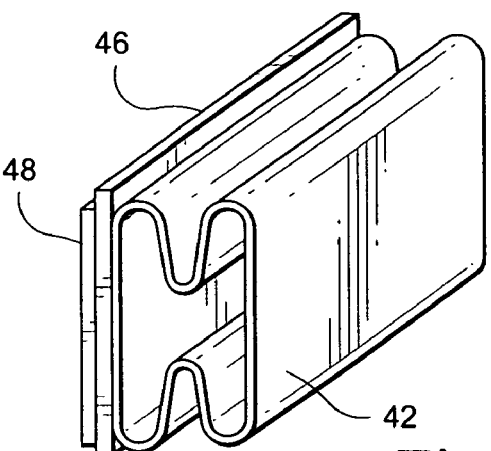
FIGS. 3 and 4 are perspective views of two different forms of a seal assembly.
Figure 4:
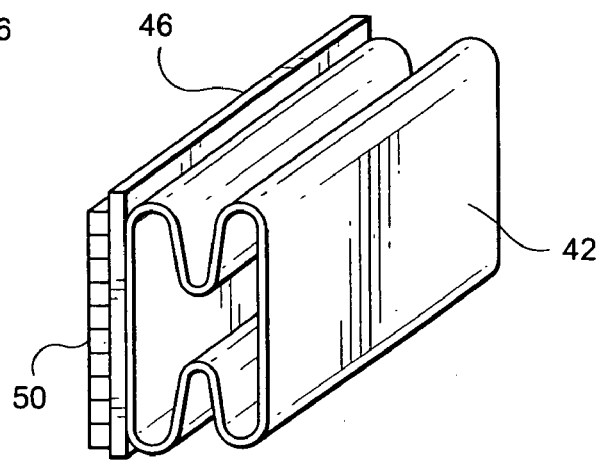

As illustrated in FIG. 2, and in accordance with a preferred aspect of the present invention, a seal assembly, generally designated 40, is provided at the interface of the nozzle retaining ring 28 and the shroud 20. A seal assembly 40 is provided for each shroud 20 and includes a spring 42 disposed in a recess 44 formed in the face of each shroud in axial opposition to the nozzle retaining ring 28. The spring is in the form of a bellows which at one end mounts a plate 46. On the opposite side of plate 46 from spring 42, there is provided a sealing material. For example, an abradable coating 48 (FIG. 3) may be provided. The coating may comprise a composition of nickel and graphite or an equivalent. Alternatively, a honeycomb seal 50 (FIG. 4) may be provided on the surface of plate 46 remote from the bellows spring 42. The honeycomb seal 50 may be formed of a nickel-based alloy or an equivalent.

With a spring assembly assembled within each recess 44 on the shroud 20, it will be appreciated that the bias of each spring 42 causes the sealing surface, either the abradable coating 48 or the honeycomb surface 50, to bear against the seal plate 34 carried by the nozzle retaining ring 28. By maintaining the seal material under load against the opposing seal surface, the coating or honeycomb seal affords flexibility to the seal and enables the seal to shape itself in a geometry that conforms to the face 31 of the nozzle retaining ring throughout the range of deformation of the retaining ring/shroud interface due to thermal and mechanical loading in cyclic operations. In this particular location, it will be appreciated that the seal prevents or minimizes the discharge of cooling air from about the nozzle assembly into the hot gas path.

Figure 5:
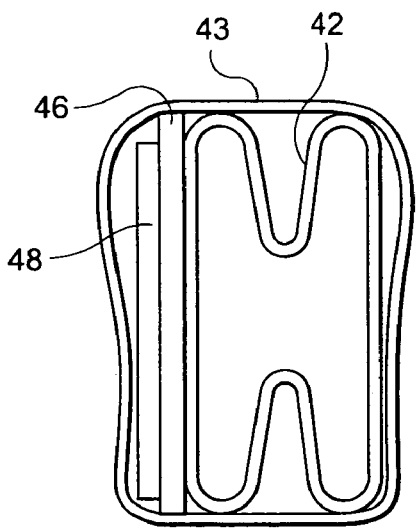
FIG. 5 is an enlarged side elevational view of the seal assembly with a wrap for releasing the seal assembly during turbine operation.

In order to install the seal assembly, and referring to FIG. 5, the spring 42 of the seal assembly is preloaded, maintained in a preloaded condition upon installation and released in response to an operating parameter of the turbine, e.g., turbine operating temperature, to engage the sealing material in sealing engagement with the face of the nozzle retaining ring, e.g., the plate 34. To accomplish this, each spring assembly is wrapped by a material which will part, release or disintegrate in response to a turbine operating condition. For example, the seal assembly may be wrapped about its entire length or portions thereof with the spring 42 preloaded. The wrap 43 may comprise Kevlar® 29. Alternatively, a high strength plastic, such as Lexan™ or Ultem™ clips, may hold the spring assembly in a compressed condition. The wrap material 43 disintegrates, weakens or self-destructs when the turbine reaches operating temperature. Upon release of the preloaded spring assembly, the spring 42 expands to load the sealing surface 48 or 50 of the seal assembly into sealing engagement with the axial aft face of the nozzle retaining ring 28. Consequently, leakage of compressor discharge air through the gaps between the interface of the retaining ring and the shroud into the hot gas path is minimized or prevented. The seal assembly, when in sealing engagement, conforms to distortions between the retaining ring wall and the shroud to seal against air leakage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A seal assembly for a turbine comprising:
   first and second generally abutting turbine components;
   a sealing plate;
   a spring on one side of said sealing plate; one of an abradable coating and a honeycomb seal on an opposite side of said plate;
   said spring bearing against said second component and biasing said one of said coating and said honeycomb seal into sealing engagement with said first component; and
   said one of said abradable coating and said honeycomb seal comprises said abradable coating.

2. A seal assembly according to claim 1 wherein said spring is preloaded for disposition between said first and second components.

3. A seal assembly according to claim 1 wherein said spring comprises a bellows between opposite sides thereof for biasing said abradable coating into engagement with said first component.

4. Apparatus for sealing between components of a gas turbine comprising:
   a nozzle retaining ring and a turbine shroud for radially overlying turbine buckets, said retaining ring and said shroud having respective first and second surfaces generally abutting one another, said second surface having a recess;
   a seal assembly disposed in said recess and including a sealing plate, a spring on one side of said sealing plate and bearing against a base of said recess and one of an abradable coating and a honeycomb seal on an opposite side of said plate from said spring and bearing against said first surface in sealing engagement therewith.

5. Apparatus according to claim 4 wherein said one of said abradable coating and said honeycomb seal comprises said abradable coating.

6. Apparatus according to claim 4 wherein said one of said abradable coating and said honeycomb seal comprises said honeycomb seal.

7. Apparatus according to claim 4 wherein said spring includes a bellows between opposite sides thereof for biasing one of said abradable coating and said honeycomb seal into engagement with said nozzle retaining ring.

8. Apparatus according to claim 4 including means for restraining said spring in a preloaded condition without substantially loading said nozzle retaining ring and said shroud under the bias of said spring; said restraining means being releasable to enable said spring to bias said plate and said one coating and said honeycomb seal into sealing engagement with said first surface in response to an operating parameter of said turbine.

9. A method of sealing between a nozzle retaining ring and a shroud for a gas turbine to minimize or preclude leakage of compressor discharge air into the hot gas path comprising the steps of:
   providing a flexible seal assembly between said nozzle retaining ring and said shroud including a plate, a spring on one side of said plate and one of an abradable coating and a honeycomb seal on an opposite side of said plate from said spring;
   constraining said spring in a preloaded condition between said nozzle retaining ring and said shroud; and
   releasing said constraint to enable said spring to bias said one of said abradable coating and said honeycomb seal against said nozzle retaining ring.

10. A method according to claim 9 including forming a recess in a surface of said shroud in opposition to a surface of said nozzle retaining ring, disposing said seal assembly in said recess in said preloaded condition and releasing said constraint to bias the one of said abradable coating and said honeycomb seal into sealing engagement with the nozzle retaining ring surface.

* * * * *